Figure 1:
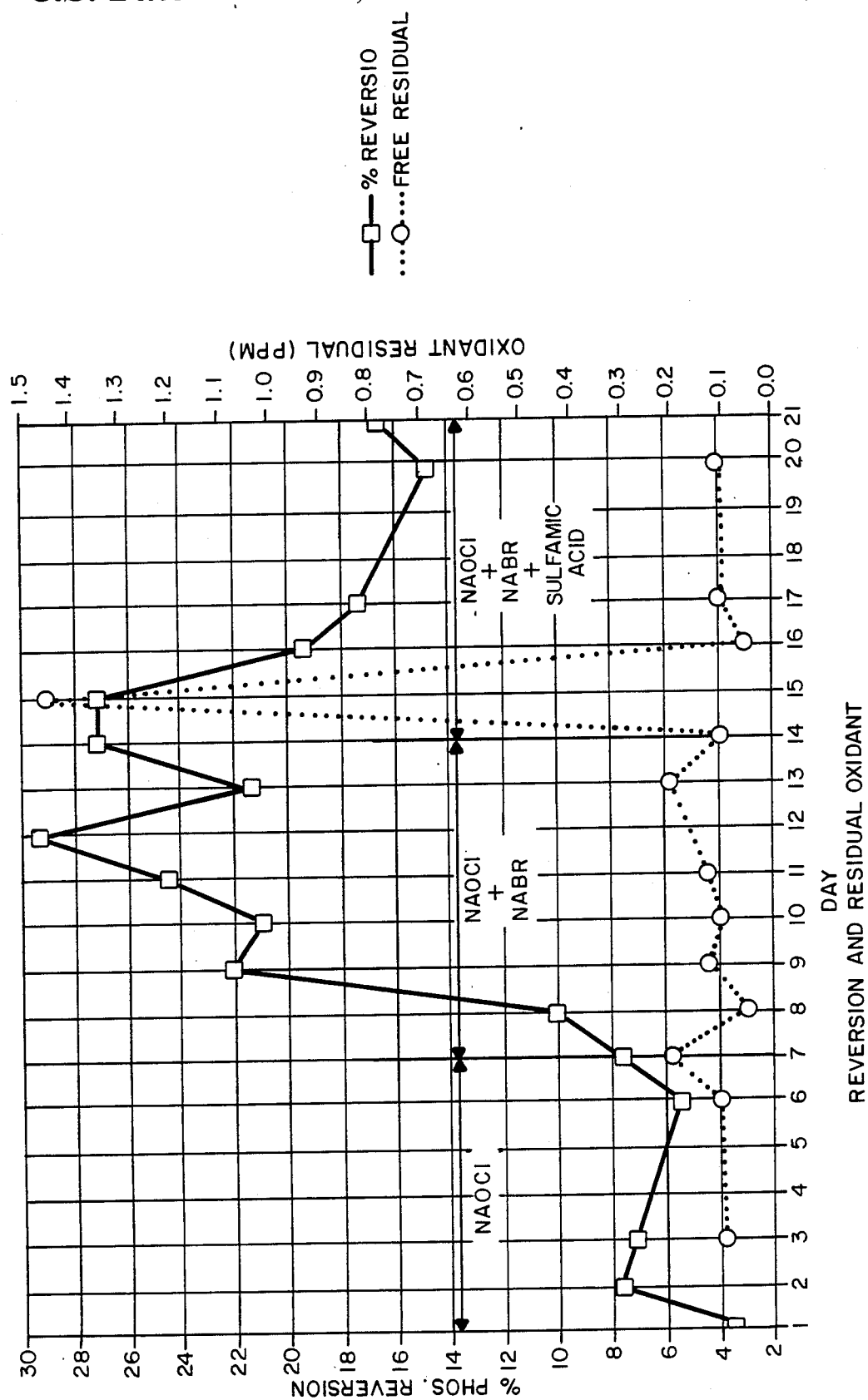

United States Patent [19]

Trulear

[11] Patent Number: 4,759,852
[45] Date of Patent: Jul. 26, 1988

[54] USE OF SULFAMIC ACID TO INHIBIT PHOSPHONATE DECOMPOSITION BY CHLORINE-BROMINE MIXTURES

[75] Inventor: Michael G. Trulear, Naperville, Ill.

[73] Assignee: Nalco Chemical Company, Naperville, Ill.

[21] Appl. No.: 108,657

[22] Filed: Oct. 15, 1987

[51] Int. Cl.[4] .............................................. C02F 5/14
[52] U.S. Cl. .................................... 210/699; 210/700; 210/754; 210/764; 252/180
[58] Field of Search ............................. 210/696–701, 210/753, 756, 764–766; 252/180, 181

[56] References Cited

U.S. PATENT DOCUMENTS

| | | | |
|---|---|---|---|
| 3,214,454 | 10/1965 | Blaser et al. | 252/180 X |
| 3,278,446 | 10/1965 | Blaser et al. | 252/545 |
| 3,336,221 | 8/1967 | Ralston | 210/700 |
| 4,026,815 | 5/1977 | Kallfass et al. | 252/180 |
| 4,451,376 | 5/1984 | Sharp | 210/701 |
| 4,642,194 | 2/1987 | Johnson | 210/699 |
| 4,643,835 | 2/1987 | Koeplin-Gall et al. | 210/754 |
| 4,711,724 | 12/1987 | Johnson | 210/754 X |

OTHER PUBLICATIONS

"Small-Scale Short-Term Methods of Evaluating Cooling Water Treatments . . . Are They Worthwhile?", D. T. Reed & R. Nass, Nalco Chemical Company, International Water Conference, Pittsburgh, Pa. Nov. 4–6, 1975.

Primary Examiner—Tom Wyse
Attorney, Agent, or Firm—John G. Premo; Anthony L. Cupoli; Donald G. Epple

[57] ABSTRACT

The decomposition of phosphonates by chlorine-bromine solutions present in industrial process waters can be diminished or prevented by treating such waters with sulfamic acid.

2 Claims, 2 Drawing Sheets

REVERSION AND RESIDUAL OXIDANT

USE OF SULFAMIC ACID TO INHIBIT PHOSPHONATE DECOMPOSITION BY CHLORINE-BROMINE MIXTURES

INTRODUCTION

The use of phosphonates for scale and corrosion control in recirculating cooling water is widely practiced as is the use of chlorine for microbiological control. However, the use of these two practices simultaneously can cause problems. Chlorine has been demonstrated to break down many phosphonates to a significant extent. When this happens in a field application, the effectiveness of the phosphonate as a scale control agent is degraded and the orthophosphate which is a product of this reaction can contribute to scaling problems. Even some reputedly chlorine-resistant phosphonates such as 1,1-hydroxyethylidine diphosphonic acid (HEDP) are not sufficiently stable for some industrial applications where continuous chlorination is practiced. Under carefully controlled conditions where the free chlorine residual is kept at a low constant level, breakdown of HEDP is minimal. However, under the less well controlled environment found in a typical plant cooling circuit, excessive chlorine levels are frequently observed. Under these conditions, HEDP or other phosphonates can break down to a sufficient degree to cause problems. Additionally, a number of dissolved ions typically found in cooling waters have been found to catalyze the breakdown of phosphonates.

The problem described above has been overcome by treating such cooling waters with sulfamic acid or other compounds. This technology is disclosed in U.S. Pat. No. 4,642,194, which is incorporated herein by reference.

It has been observed that when the biocide in cooling waters is a mixture of chlorine in combination with a bromide salt capable of releasing bromide ions, a much more profound and exaggerated degradation of the phosphonates occurs. It is an object of the invention to prevent this unexpected, rapid decomposition of phosphonates by mixtures of chlorine and bromide ions present as biocides in industrial cooling waters.

THE INVENTION

The invention is a method for preventing the decomposition of phosphonates which are present in cooling waters to prevent scale and corrosion in industrial cooling waters which also contain as a biocide the combination of chlorine and a bromide salt which releases bromide ions which comprises treating said waters with at least 1 ppm of sulfamic acid for each ppm of bromide.

The Chlorine-Bromide Biocides

The biocides comprise a chlorine solution and a bromide salt capable of releasing bromide ions to the chlorine solution.

Suitable bromide salts include the alkali and alkaline earth metal bromides but are not limited thereto. For instance, magnesium bromide, calcium bromide, sodium bromide, potassium bromide, ammonium bromide, and the like salts can be used, either singly or as mixture of two or more as desired.

A bromide salt, for example, sodium bromide, when introduced into a chlorine solution in which the chlorine is present mostly as hypochlorous acid, has been shown to at least partially displace chlorine, resulting in the formation of the active biocide, hypobromous acid, and innoxious sodium chloride by-product as follows:

In present chlorination installations, the bromide salt can merely be introduced downstream of the chlorine educting water line, at which point gaseous chlorine has already been introduced into a water stream and hydrolyzed to form the hypochlorous acid and hydrochloric acid, which usually would be an acidic chlorine solution. It can also be introduced into chlorine solutions formed from sodium or calcium hypochlorite or other chlorine donors and will undergo the same reactions.

The bromide salts are themselves generally innoxious salts and thus their use in combination with chlorine presents no new or unknown hazards. Advantages of using the bromide salts along with chlorine is the formation of a more effective biocide solution due to the formation of hypobromous acid. The use of bromide salts along with chlorine for improved biocontrol effectiveness is described in detail in the following patents: U.S. Pat. Nos. 4,451,376 and 4,643,835, which are incorporated herein by reference.

The degree of conversion of hypochlorous acid to hypobromous acid depends of course to an extent on the relative proportion of bromide salt to hypochlorous acid which are combined to form the composition and other factors affecting the displacement of chlorine with bromine.

Although the present invention encompasses any proportion of bromide salt to chlorine, in a preferred embodiment the present invention includes the combination of bromide salt to chlorine as hypochlorous acid in the proportion of about 0.25 to about 1.5 equivalents and, more preferably, about 0.5 to about 1.0 equivalents (chemical equivalent weight basis).

The chlorine and bromine-containing compositions are rendered more effective for the control of microorganisms by the inclusion therewith of surface active agents which may, for purposes of convenience, be referred to as "biodispersants". When these materials are used, the amount present in the composition ranges between about 1 up to about 10% by weight.

The biodispersants are preferably chosen from the group consisting of ethylene oxide condensates with propylene oxide adducts or propylene glycol having an HLB between 4–10 and a molecular weight between 1,000–5,000, nonionic polyethoxylated straight chain alcohols, tris cyanoethylated cocodiamines, polyoxyethylene sorbitan ester/acids, nonionic N,N, dimethyl stearamides, nonionic amine polyglycol condensates, and nonionic ethoxylated alcohols.

The Phosphonates

Phosphonates which are relevant to the invention include any phosphonate which is degraded by the biocide combination described, but especially:

(1) 1,1-hydroxyethylidine diphosphonic acid (HEDP);
(2) tris aminomethane phosphonic acid (AMP);
(3) 1-phosphono glycolic acid (PGA);
(4) ethylene diamine tetra(methylenephosphonic acid) ENTP;
(5) hexamethylene diamine tetra(methylenephosphonic acid) (HMTP);
(6) diethylene triamine penta(methylenephosphonic acid):

As indicated, the phosphonates are well known materials and are described in the following patents: U.S. Pat. Nos. 3,214,454; 4,026,815; 3,336,221; and 3,278,446. They all may be used as the free acid or their water-soluble salt form.

The Sulfamic Acid

The sulfamic acid may be employed as the free acid or as one of its water-soluble salts such as the sodium, potassium or ammonium salt.

Dosage

The sulfamic acid is dosed based upon the bromide (Br) part in the cooling water. The amount used can be as little as 1 ppm of sulfamic acid for each ppm of bromide present. Higher dosages within the range of 1–4 ppm may be used, although excellent results are achieved when the dosage is between 1–2 ppm.

Evaluation of the Invention

The use of sulfamic acid for phosphonate stabilization was evaluated in a pilot cooling tower (PCT) apparatus. This device is described in the article: "Small-Scale Short-Term Methods of Evaluating Cooling Water Treatments . . . Are They Worthwhile?", D. T. Reed and R. Nass, Nalco Chemical Company, International Water Conference, Pittsburgh, Pa., Nov. 4–6, 1975.

Two PCT tests were used to evaluate the invention. Objectives of the tests were to determine:

(1) the decomposition of phosphonate by bromine in the absence of stabilizer;

(2) the effect of sulfamic acid in reducing the decomposition.

Experimental Procedures

The composition of water used in the pilot cooling tower tests was four concentration synthetic lake water. Concentration ratio of tower water was held constant by a conductivity controller. Cooling water pH was controlled by 9.0±0.2 using dilute $H_2SO_4$ feed and a pH controller. Chlorine was introduced into the system using diluted mixtures of 5.25% sodium hypochlorite at feed rates necessary to maintain a 0.1–0.2 ppm free residual. A scale control program containing 6% HEDP for scale control was fed to the tower at rates proportional to blowdown to maintain a constant theoretical level of HEDP in the tower water. Based on daily tower water analyses, HEDP feed rates were adjusted as necessary to maintain the desired level of HEDP. Two separate PCT tests were conducted. Each test included three phases:

1. Baseline decomposition: Feed sodium hypochlorite to maintain a 0.1 to 0.2 ppm free residual and determine HEDP decomposition from daily phosphate analyses.

2. Bromine induced decomposition: Introduce sodium bromide feed and determine effect on HEDP and orthophosphate levels.

3. Stabilization: Once a steady state level of bromine HEDP decomposition was obtained, feed sulfamic acid and determine effect on HEDP and orthophosphate levels.

Results and Discussion

Figure 2:
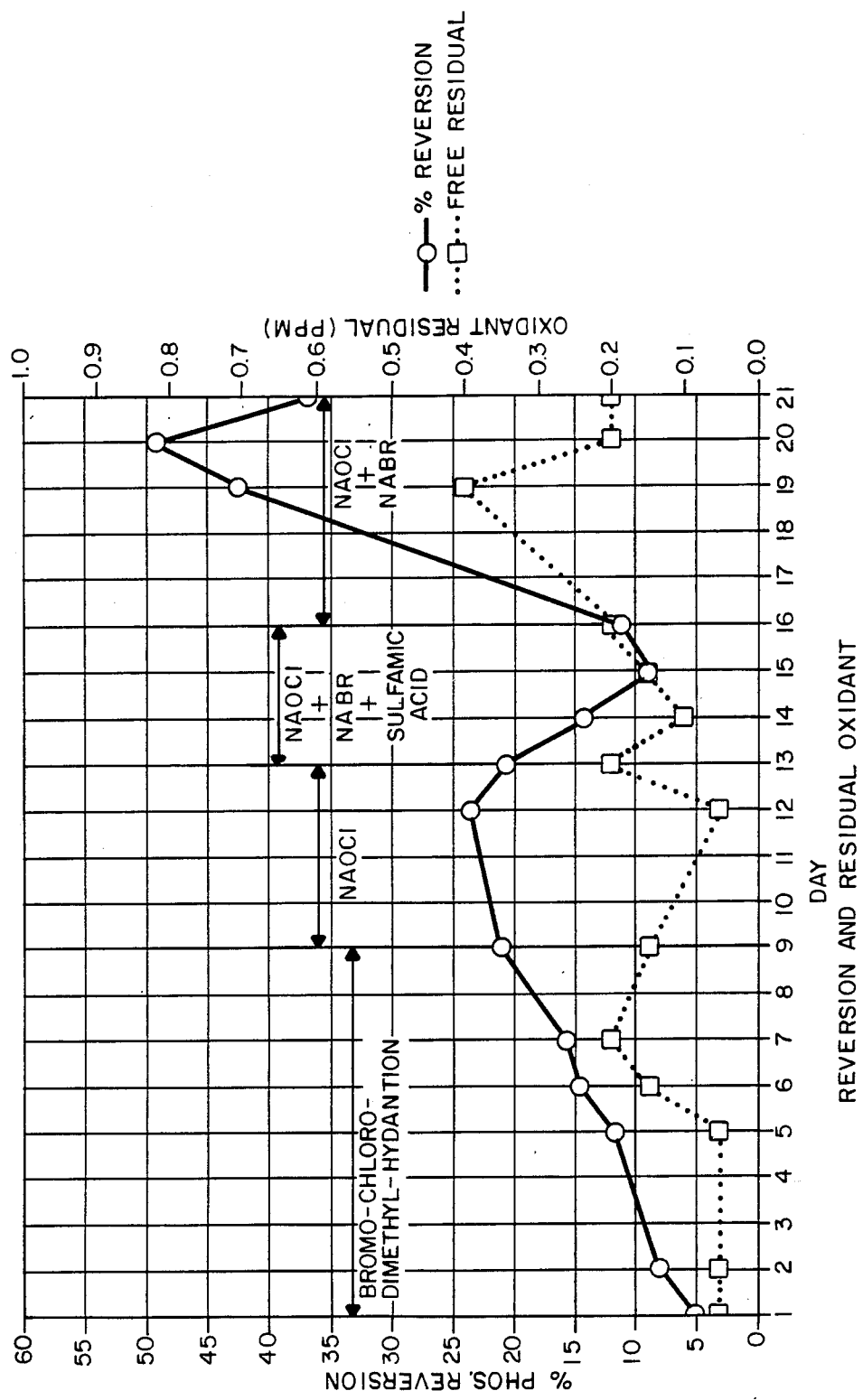

Results from the two pilot cooling tower tests are shown in FIGS. 1 and 2. In test number one, the first week of the experiment was used to establish baseline decomposition. On day seven, 10 ppm sodium bromide feed (8 ppm as $Br^-$) was initiated and immediately phosphonate decomposition increased reaching a steady state of approximately 25%. 10 ppm sulfamic acid feed was then introduced and, after an initial reduction in chlorine feed to maintain the desired 0.1–0.2 ppm free residual, phosphonate decomposition immediately fell. The test was discontinued one week following the start of stabilizer feed.

FIG. 2 shows results obtained in the second PCT stabilization tests. As shown in FIG. 2, only the latter two weeks of the test were used for evaluation of the present invention. In this test, days 9–13 were used to establish baseline decomposition, days 13–16 sodium bromide and sulfamic acid were fed, and for the final five (5) days of the test, sodium bromide alone was fed with hypochlorite. As in the first PCT test, the combination of chlorine and bromine resulted in significantly higher levels of phosphonate decomposition.

Table I below summarizes the PCT test results and clearly shows the efficacy of sulfamic acid in reducing phosphonate decomposition.

TABLE I

Pilot Cooling Tower Bromine Phosphonate Decomposition - Summary[1]

| Biocide Feed | Treatment Duration (Days) | Free Halogen Residual (ppm) | % Phosphonate Degradation |
|---|---|---|---|
| NaOCl | 5 | 0.13 ± 0.07 | 12.9 ± 8.5 |
| NaOCl + NaBr | 9 | 0.04 ± 0.06 (Chlorine) 0.14 ± 0.06 (Bromine) | 28.3 ± 12.2 |
| NaOCl + NaBr + Sulfamic Acid | 6 | 0.05 ± 0.05 (Chlorine) 0.08 ± 0.03 (Bromine) | 14.3 ± 3.9 |

[1]Phosphonate - HEDP
NaBr Feed - 8 ppm as $Br^-$
Sulfamic Acid Feed - 10 ppm

Having thus described my invention, I claim:

1. A method for preventing the decomposition of phosphonates which are present in cooling waters to prevent scale and corrosion in industrial cooling waters which also contain as a biocide the combination of chlorine and a bromide salt which releases bromide ions which comprises treating said waters with at least 1 ppm of sulfamic acid for each ppm of bromide.

2. The method of claim 1 wherein the phosphonate is 1,1-hydroxyethylidine diphosphonic acid.

* * * * *